(12) United States Patent
Badger, II et al.

(10) Patent No.: US 11,260,762 B2
(45) Date of Patent: Mar. 1, 2022

(54) AUXILIARY BATTERY CHARGING SYSTEMS AND METHODS FOR ELECTRIFIED VEHICLES

(71) Applicant: FORD GLOBAL TECHNOLOGIES, LLC, Dearborn, MI (US)

(72) Inventors: Charles Everett Badger, II, Westland, MI (US); Josephine S. Lee, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 954 days.

(21) Appl. No.: 15/966,126

(22) Filed: Apr. 30, 2018

(65) Prior Publication Data

US 2019/0329656 A1 Oct. 31, 2019

(51) Int. Cl.
*H02J 7/00* (2006.01)
*H02J 7/14* (2006.01)
*B60L 53/00* (2019.01)
*B60L 58/13* (2019.01)
*B60L 58/21* (2019.01)

(52) U.S. Cl.
CPC ............... *B60L 53/00* (2019.02); *B60L 58/13* (2019.02); *B60L 58/21* (2019.02); *B60L 2250/16* (2013.01)

(58) Field of Classification Search
USPC ........................................................ 320/109
See application file for complete search history.

(56) References Cited

U.S. PATENT DOCUMENTS

| | | | |
|---|---|---|---|
| 8,615,355 B2 | 12/2013 | Inbarajan et al. | |
| 9,840,156 B2 | 12/2017 | DeBoer, III | |
| 2009/0103341 A1* | 4/2009 | Lee | B60L 53/24 |
| | | | 363/124 |
| 2011/0047102 A1 | 2/2011 | Grider et al. | |
| 2013/0127418 A1* | 5/2013 | Oh | B60L 58/20 |
| | | | 320/109 |
| 2014/0006137 A1* | 1/2014 | Melen | B60L 53/63 |
| | | | 705/14.35 |
| 2015/0097525 A1* | 4/2015 | DeDona | B60L 53/11 |
| | | | 320/109 |
| 2015/0097526 A1* | 4/2015 | DeDona | B60L 3/00 |
| | | | 320/109 |
| 2015/0097527 A1* | 4/2015 | DeDona | B60L 53/18 |
| | | | 320/109 |
| 2016/0009192 A1 | 1/2016 | Zhang et al. | |
| 2016/0042377 A1 | 2/2016 | Ilic et al. | |
| 2016/0264008 A1 | 9/2016 | Kintner-Meyer | |
| 2016/0352120 A1* | 12/2016 | Lovett | B60W 20/13 |
| 2017/0355268 A1 | 12/2017 | Roberts et al. | |
| 2018/0208066 A1* | 7/2018 | Rao | B60L 3/00 |
| 2019/0006724 A1* | 1/2019 | Cho | B60L 58/21 |
| 2019/0176642 A1* | 6/2019 | Diab | B60L 58/12 |

* cited by examiner

*Primary Examiner* — Alexis B Pacheco
(74) *Attorney, Agent, or Firm* — David B. Kelley; Carlson, Gaskey & Olds, P.C.

(57) ABSTRACT

This disclosure describes vehicle systems and methods for controlling charging of an auxiliary battery of an electrified vehicle. Exemplary charging methods align the charge management of an auxiliary battery to occur only during low cost charging windows.

18 Claims, 4 Drawing Sheets

AUXILIARY BATTERY CHARGING SYSTEMS AND METHODS FOR ELECTRIFIED VEHICLES

TECHNICAL FIELD

This disclosure relates to vehicle systems and methods for controlling charging of electrified vehicle auxiliary batteries.

BACKGROUND

The desire to reduce automotive fuel consumption and emissions has been well documented. Electrified vehicles are being developed that reduce or completely eliminate reliance on internal combustion engines. In general, electrified vehicles differ from conventional motor vehicles because they can be selectively driven by one or more battery powered electric machines. Conventional motor vehicles, by contrast, rely exclusively on the internal combustion engine to propel the vehicle.

Electrified vehicles may include a high voltage traction battery pack for powering various high voltage loads of the vehicle and an auxiliary battery for powering various low voltage loads of the vehicle. The high voltage battery pack and the low voltage auxiliary battery of some electrified vehicles, such as battery electric vehicles (BEV) and plug-in hybrid electric vehicles (PHEV), are typically charged using energy from a utility grid or other off-board power source.

SUMMARY

A method according to an exemplary aspect of the present disclosure includes, among other things, performing charge management of a low voltage battery of an electrified vehicle, via a vehicle charging system onboard the electrified vehicle, including waking-up the vehicle charging system during a next available low cost charging window subsequent to charging a high voltage battery pack of the electrified vehicle.

In a further non-limiting embodiment of the foregoing method, performing the charge management includes charging the high voltage battery pack and the low voltage battery together during a programmed charging window that occurs prior to the next available low cost charging window.

In a further non-limiting embodiment of either of the foregoing methods, the method includes receiving a charging window input from a human machine interface system or a personal electronic device. The charging window input is used to establish the programmed charging window.

In a further non-limiting embodiment of any of the foregoing methods, the method includes charging the high voltage battery pack and the low voltage battery together during the programmed charging window if a current time falls within the programmed charging window.

In a further non-limiting embodiment of any of the foregoing methods, performing the charge management includes entering a sleep mode if the high voltage battery pack does not require charging during the next available low cost charging window.

In a further non-limiting embodiment of any of the foregoing methods, performing the charge management includes waking-up the vehicle charging system twenty-four hours subsequent to entering the sleep mode.

In a further non-limiting embodiment of any of the foregoing methods, performing the charge management includes charging the low voltage battery after waking-up the vehicle charging system from the sleep mode if a charge level of the low voltage battery is below a predefined threshold.

In a further non-limiting embodiment of any of the foregoing methods, the method includes determining the next available low cost charging window based at least on electrical rate information that includes associated costs for supplying energy from an electrical grid during each hour of a given day.

In a further non-limiting embodiment of any of the foregoing methods, the method includes retrieving the electrical rate information from a web-based server.

In a further non-limiting embodiment of any of the foregoing methods, performing the charge management includes aligning the charge management to occur based off of a programmed charging window associated with the high voltage battery pack.

A vehicle charging system according to another exemplary aspect of the present disclosure includes, among other things, a high voltage battery pack, a low voltage battery, and a control system configured to command a system wake-up during a next available low cost charging window subsequent to charging the high voltage battery pack and command charge management of the low voltage battery subsequent to the next available low cost charging window if a charge level of the low voltage battery is below a predefined threshold.

In a further non-limiting embodiment of the foregoing vehicle charging system, a human machine interface system is configured for programming a charging window for charging the high voltage battery pack.

In a further non-limiting embodiment of either of the foregoing vehicle charging systems, a communication system is configured to retrieve electrical rate information from a web-based server.

In a further non-limiting embodiment of any of the foregoing vehicle charging systems, the control system is configured to enter a sleep mode if the high voltage battery pack does not require charging during the next available low cost charging window.

In a further non-limiting embodiment of any of the foregoing vehicle charging systems, the control system is configured to command a second system wake-up subsequent to entering the sleep mode.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes vehicle systems and methods for controlling charging of an auxiliary (i.e., low voltage) battery of an electrified vehicle. An exemplary charging method aligns charge management of an auxiliary battery to occur only during low cost charging windows. The proposed systems and methods therefore achieve a more cost-effective methodology for maintaining the state of health of the auxiliary battery. These and other features are discussed in greater detail in the following paragraphs of this detailed description.

Figure 1:
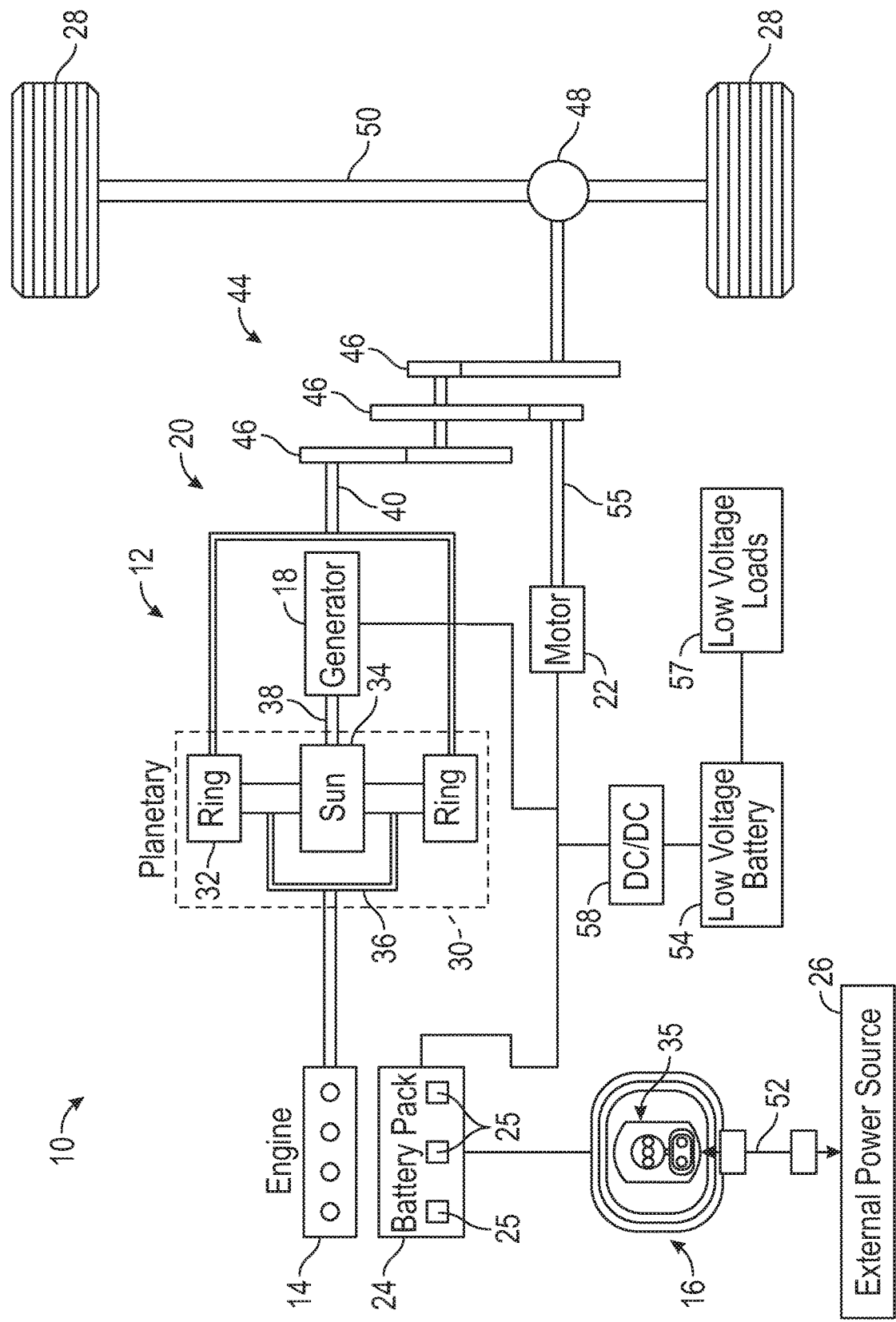
FIG. 1 schematically illustrates a powertrain of an electrified vehicle.

FIG. 1 schematically illustrates a powertrain 10 for an electrified vehicle 12. In an embodiment, the electrified vehicle 12 is a plug-in hybrid electric vehicle (PHEV). In another embodiment, the electrified vehicle is a battery electric vehicle (BEV).

In an embodiment, the powertrain 10 is a power-split powertrain system that employs a first drive system and a second drive system. The first drive system may include a combination of an engine 14 and a generator 18 (i.e., a first electric machine). The second drive system includes at least a motor 22 (i.e., a second electric machine) and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, etc.

The engine 14, which in an embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28. In one embodiment, the power transfer units 30, 44 are part of a transaxle 20 of the electrified vehicle 12.

The motor 22 can also be employed to drive the vehicle drive wheels 28 by outputting torque to a shaft 55 that is also connected to the second power transfer unit 44. In one embodiment, the motor 22 is part of a regenerative braking system. For example, the motor 22 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices can also be used to electrically power the electrified vehicle 12.

The electrified vehicle 12 may additionally include a low voltage battery 54, which may also be referred to as an auxiliary battery. The low voltage battery 54 may be provided for powering various low voltage loads 57 of the electrified vehicle 12. Non-limiting examples of low voltage loads include infotainment systems, lighting systems, power windows, power seats, cooling fan, A/C compressor, instrument clusters, control modules, etc. A power converter, such as DC/DC converter 58, may be provided to convert a high voltage DC output from the battery pack 24 to a low voltage DC supply that is compatible with the low voltage battery 54.

In an embodiment, the low voltage battery 54 is a 12V battery. However, in this disclosure, the term "low voltage battery" could include any battery that is less than 60V. The low voltage battery 54 and the low voltage loads 57 are generally part of a low-voltage system of the electrified vehicle 12, whereas the high voltage battery pack 24 is generally part of a relatively high voltage system of the electrified vehicle 12. Thus, the high voltage battery pack 24 can be used to power propulsion of the electrified vehicle 12, whereas the low voltage battery 54 does not generally power propulsion of the vehicle.

The electrified vehicle 12 may also be equipped with a charging system 16 for charging the energy storage devices (e.g., battery cells) of the battery pack 24 and the low voltage battery 54. The charging system 16 may be connected to an external power source 26 (e.g., utility/grid power from an electrical grid) for receiving and distributing power throughout the electrified vehicle 12.

In an embodiment, the charging system 16 includes a vehicle inlet assembly 35 located on-board the electrified vehicle 12, and an electric vehicle supply equipment (EVSE) assembly 52 (or charge cord of a charging station) that can be operably connected between the vehicle inlet assembly 35 and the external power source 26. The vehicle inlet assembly 35 may include one or more ports adapted to receive a coupler of the EVSE assembly 52. The vehicle inlet assembly 35 is therefore configured to receive power from the external power source 26 and then supply the power to the battery pack 24 and/or the low voltage battery 54.

The charging system 16 may be equipped with power electronics for converting AC power received from the external power source 26 to DC power for charging the energy storage devices of the battery pack 24. The charging system 16 is also configured to accommodate one or more conventional voltage sources from the external power source 26 (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure. In addition, the teachings of this disclosure could be applied to any electrified vehicle that has programmable charging windows and both high and low voltage batteries/power sources.

Figure 2:
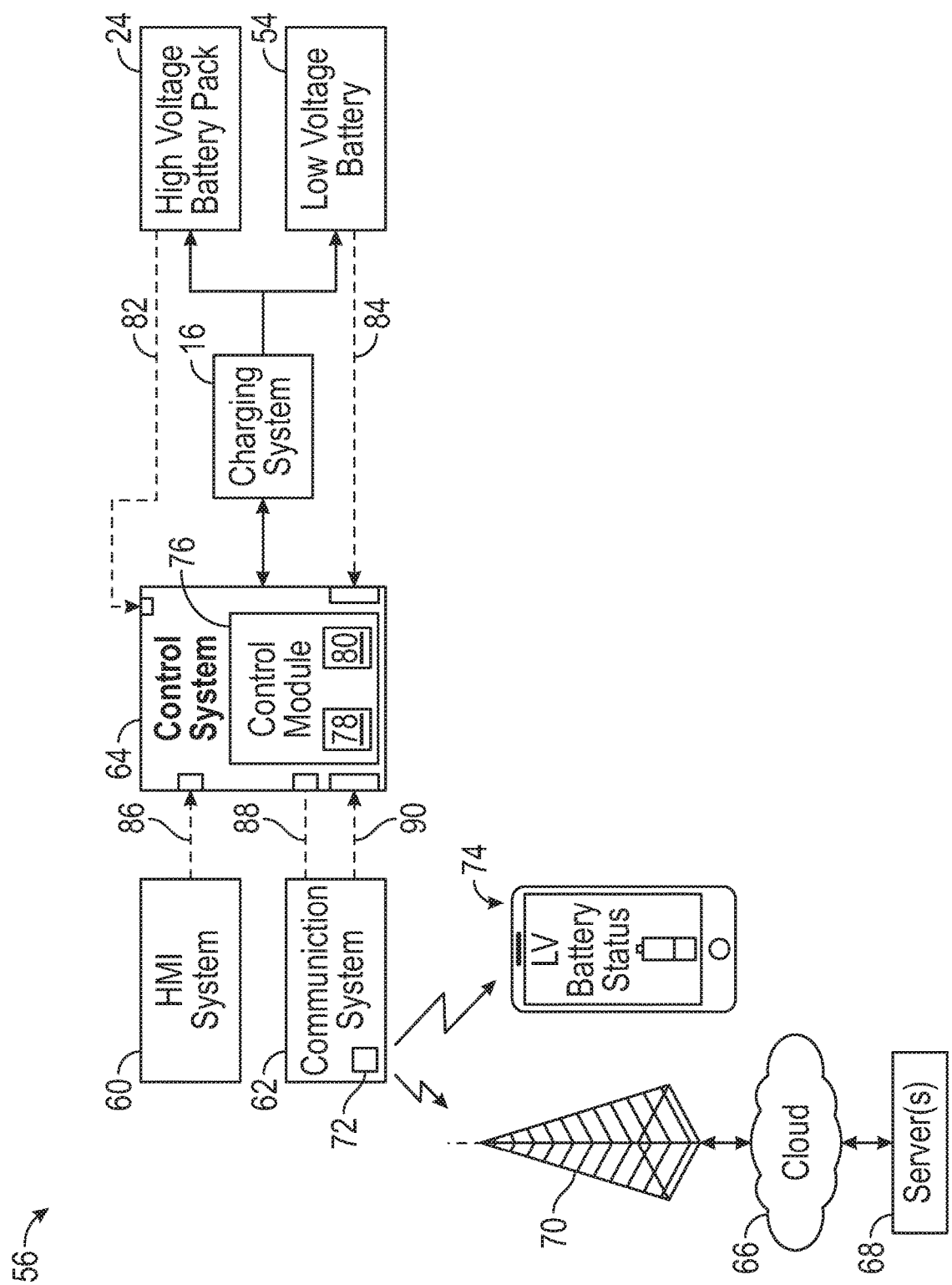
FIG. 2 schematically illustrates a vehicle charging system of an electrified vehicle.

FIG. 2 is a highly schematic depiction of a vehicle charging system 56 that may be employed within an electrified vehicle, such as the electrified vehicle 12 of FIG. 1. The various components of the vehicle charging system 56 are shown schematically to better illustrate the features of this disclosure.

The exemplary vehicle charging system 56 may control charging (e.g., by controlling the charging system 16) of both the high voltage battery pack 24 and the low voltage battery 54. The low voltage battery 54 may power low-voltage loads even when the electrified vehicle 12 is keyed off and not operating, such as when the vehicle is stored, parked, or transported, for example. A charge level, or state of charge (SOC), of the low voltage battery 54 can be reduced due to powering the low-voltage loads 57. If the electrified vehicle 12 is idle for an extended period of time, the charge level of the low voltage battery 54 can be depleted to a point at which it is unable to power the low-voltage loads. This could prevent, among other things, starting the electrified vehicle 12 after the extended period. Because of this, the state of health of the low voltage battery 54 may be periodically monitored in order to maintain the charge level of the low voltage battery 54 above a predefined threshold. This periodic monitoring of the low voltage battery 54 may be referred to as charge management or charge maintenance of the low voltage battery 54.

In an embodiment, the vehicle charging system 56 is adapted to control the charge management of the low voltage battery 54 so that it occurs only during low cost charging windows. For example, in an embodiment, the vehicle charging system 56 aligns the charge management of the low voltage battery 54 to occur during an upcoming low cost charging window. Low cost charging windows as described herein represent periods of time during a given day at which the electrical rate for supplying power from the external power source is lower than the electrical rate for supplying power at other periods of time of the day. For example, the electrical rate may be $0.40 per kWhr from the hours of 8 a.m. to 10 p.m. but may drop to only $0.10 per kWhr from the hours of 10 p.m. to 8 a.m. In this example, the time period from 10 p.m. to 8 a.m. is considered to be a low cost charging window.

In addition to the high voltage battery pack 24, the low voltage battery 54, and the charging system 16, the exemplary vehicle charging system 56 may include a human machine interface (HMI) system 60, a communication system 62, and a control system 64. These systems are further detailed below.

The HMI system 60 may be located within a passenger cabin of the electrified vehicle 12 and may include one or more user interfaces. A user may interact with each user interface via a touch screen, tactile buttons, audible speech, speech synthesis, etc. The user can either enter information into the user interface or the user interface can display information to the user. In an embodiment, the user can program specific charging windows for charging the high voltage battery 24 and the low voltage battery 54 by using the HMI system 60.

The communication system 62 may be configured to communicate over a cloud 66 (i.e., the internal to obtain various information stored on one or more servers 68. Each server 68 can identify, collect, and store data associated with the electrified vehicle 12 for validation purposes. Upon an authorized request, data may be subsequently transmitted to the communication system 62, via a cellular tower 70 or some other known communication technique (e.g., Wi-Fi, Bluetooth, etc.). The communication system 62 may include a transceiver 72 for achieving bidirectional communication with the cellular tower 70. For example, the transceiver 72 can receive data from the servers 68 or can communicate data back to the servers 68 via the cellular tower 70. Although not necessarily shown or described in this highly schematic embodiment, numerous other components may enable bidirectional communication between the electrified vehicle 12 and the web-based servers.

In an embodiment, the communication system 62 communicates with one or more of the servers 68 to obtain the current electrical rates associated with each time of the day for supplying energy from the electrical grid. The data received by the communication system 62 from the servers 68 may be communicated to the control system 64 where it can be used in combination with various other data to determine when to charge the high voltage battery 24 and when to perform charge management of the low voltage battery 54.

The communication system 62 may also be configured to communicate with a personal electronic device 74 of the user, which is a device that is separate from the electrified vehicle 12. In an embodiment, the personal electronic device 74 is a cell phone. The communication system 62 can wirelessly communicate with the personal electronic device 74 via the transceiver 72. In an embodiment, the user can program specific charging windows for charging the high voltage battery 24 and the low voltage battery 54 by entering commands into the personal electronic device 74.

The control system 64 of the vehicle charging system 56 may control charging of the high voltage battery pack 24 and the low voltage battery 54 by controlling operation of the charging system 16. For example, the control system 64 may instruct the charging system 16 about when to begin charging, when to end charging, the length of charging, the power levels of the charging, etc.

The control system 64 may be part of an overall vehicle control system or could be a separate control system that communicates with the vehicle control system. The control system 64 may include one or more control modules 76 equipped with executable instructions for interfacing with and commanding operation of various components of the vehicle charging system 56. For example, in an embodiment, each of the battery pack 24, the charging system 16, the HMI system 60, and the communication system 62 include a control module, and these control modules can communicate with one another over a controller area network to control charging of the high voltage battery pack 24 and the charge management of the low voltage battery 54. In another embodiment, each control module 76 of the control system 64 includes a processing unit 78 and non-transitory memory 80 for executing the various control strategies and modes of the vehicle charging system 56.

The control module 76 of the control system 64 may receive and process various inputs for creating a charging schedule for charging the high voltage battery pack 24 and for performing charge management of the low voltage battery 54. A first input to the control module 76 may include battery information 82 from the high voltage battery pack 24. The battery information 82 may be communicated from a battery electric control module associated with the high voltage battery pack 24 and may include information such as the current battery state of charge, battery temperature, battery age, etc.

A second input to the control module 76 may include battery information 84 from the low voltage battery 54. The battery information 84 may include information such as current battery state of charge, battery temperature, battery voltage, battery health, age, etc.

A third input to the control module 76 may include charging window information 86 received from the HMI system 60. The charging window information 86 may include the specific charging windows specified by the user on the HMI system 60 for charging the high voltage battery pack 24 and the low voltage battery 54.

A fourth input to the control module 76 may include charging window information 88 received from the communication system 62. The charging window information 88 may include the specific charging windows specified by the user on the personal electronic device 74 for charging the low voltage battery 54.

A fifth input to the control module 76 may include electrical rate information 90. The electrical rate information 90 may be received from the communication system 62 after being retrieved from one of the servers 68 over the cloud 66. The electrical rate information 90 may include the associated cost for supplying energy from the electrical grid during each hour of a given day.

In addition to scheduling charging of the high voltage battery pack 24, the control module 76 may also be programmed to execute one or more algorithms for controlling charging of the low voltage battery 54 in a manner that aligns the charge management of the low voltage battery 54 with the charging windows that have been programmed into the control system 64. For example, the inputs 82-90 can be used to create a buffer wake-up that aligns the charge management of the low voltage battery 54 with a next available low cost charging window. In this way, the charge management of the low voltage battery 54 will always occur during lower cost charging window periods rather than during higher cost charging window periods.

Figure 3:
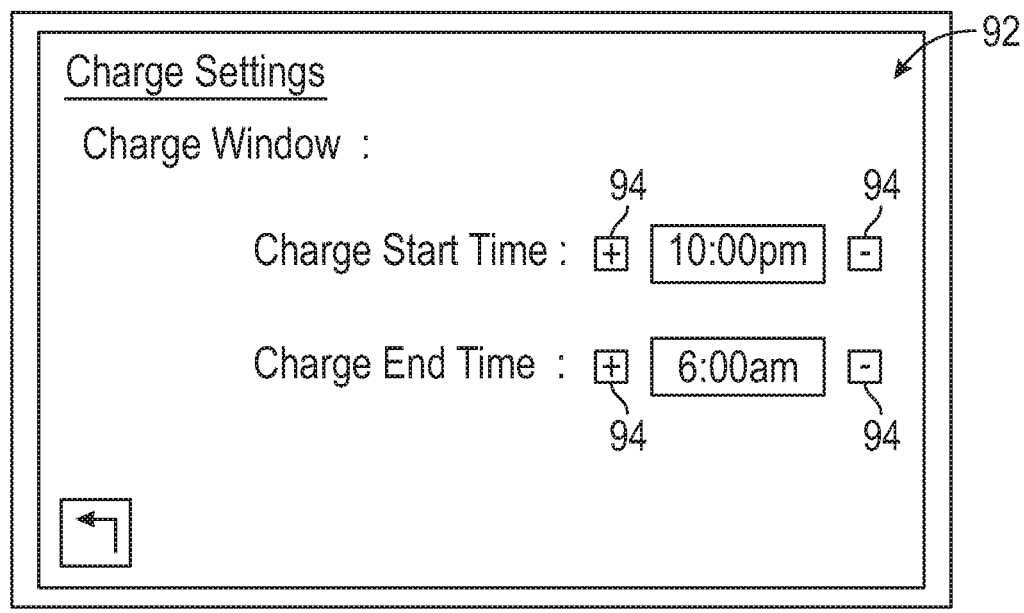
FIG. 3 illustrates an exemplary user interface of a human machine interface system of the vehicle charging system of FIG. 2.

As iterated above, the user may specifically program the charging windows during which the electrified vehicle 12 will be charged by entering information onto a user interface of the HMI system 60. For example, as shown in FIG. 3, an exemplary user interface 92 of the HMI system 60 may include tactile buttons 94 that permit the user to, for example, specify a charge start time and a charge complete time for specifically establishing an acceptable charge window for enabling charging. Other charge settings could also be selected using the user interface 92, including but not limited to, specifying different charging windows for different days (e.g., weekend versus weekday charging), specifying a price threshold above which charging should not be enabled, permitting utility interruption during charging, etc.

Figure 4:
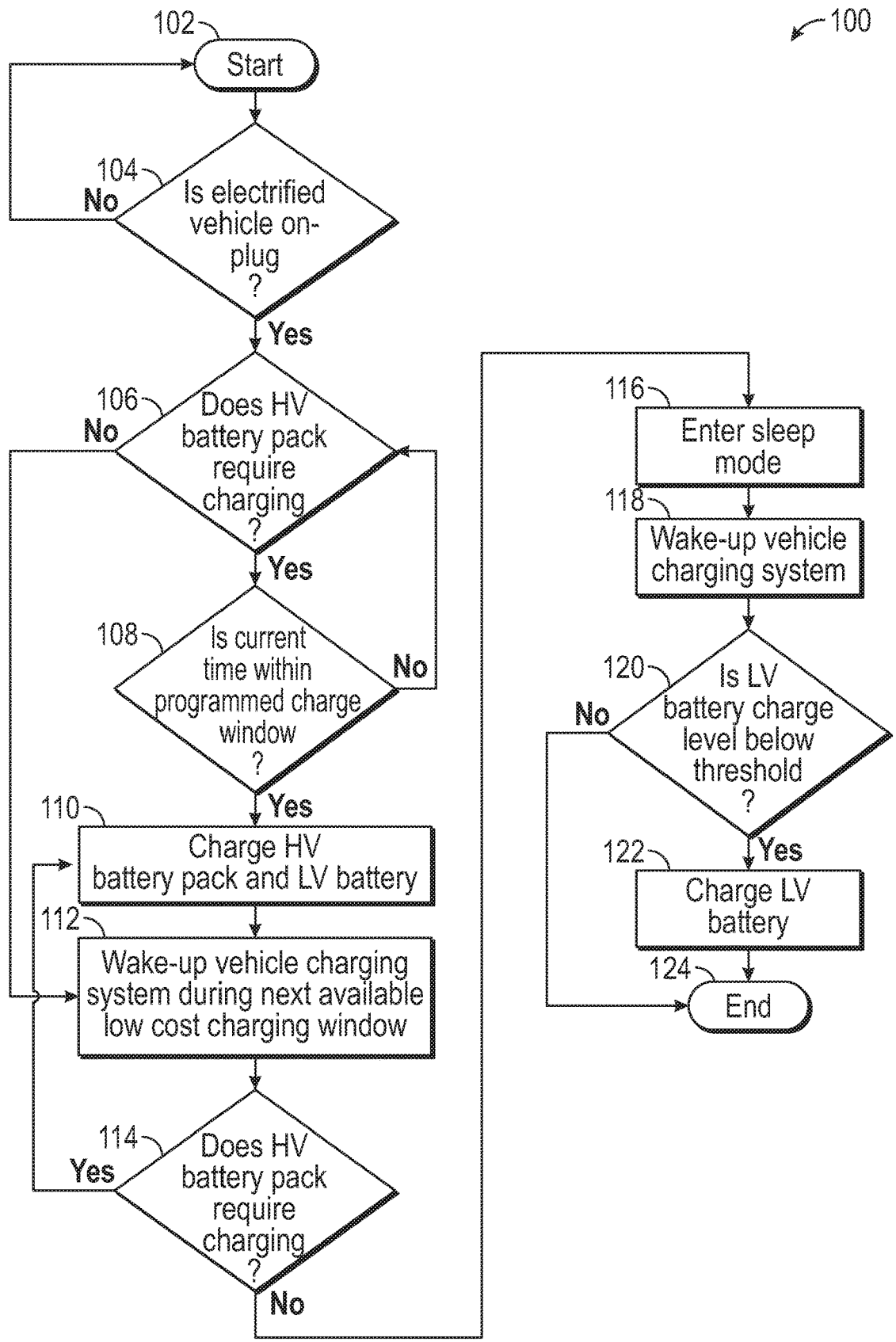
FIG. 4 schematically illustrates an exemplary method for controlling charging of a low voltage battery of an electrified vehicle.

FIG. 4, with continued reference to FIGS. 1-3, schematically illustrates an exemplary method 100 for controlling charging of the low voltage battery 54 of the electrified vehicle 12 in a manner that aligns the charge management of the low voltage battery 54 with the charging windows that are currently programmed into the vehicle charging system 56. In an embodiment, the control module 76 of the control system 64 of the vehicle charging system 56 is programmed with one or more algorithms adapted to execute the exemplary method 100.

The method 100 begins at block 102. At block 104, the control module 76 determines whether the electrified vehicle 12 is on-plug (i.e., the charging system 16 has been connected to an external power source). For example, the control module 76 may periodically analyze signals received from the charging system 16 to determine whether it has been connected to the external power source 26. If a YES flag is returned at block 104, the method 100 proceeds to block 106.

At block 106, the control module 76 may determine whether or not the HV battery pack 24 requires charging. For example, the control module 76 may analyze the battery information 82 from the high voltage battery pack 24 to determine whether the HV battery pack 24 needs to be charged. This may include determining whether the SOC of the high voltage battery pack 24 is below a predefined threshold. If a NO flag is returned, the method 100 may proceed to block 112 (discussed below). Alternatively, if a YES flag is returned, the method 100 may proceed to block 108.

The control module 76 may determine whether a current time falls within a pre-programmed charging window at block 108. For example, the control module 76 may analyze the charging window information 86 received from the HMI system 60 and/or the charging window information 88 received from the communication system 62 to determine whether or not the current time is within the programmed charging window.

The method 100 may next proceed to block 110 by charging both the HV battery pack 24 and the low voltage battery 54 if the current time is found to be within the programmed charging window at the previous block 108. The control module 76 may control the charging system 16 for delivering power to both the HV battery pack and the low voltage battery 54 during block 110. In an embodiment, the HV battery pack and the low voltage battery 54 are simultaneously charged at clock 110.

The low voltage battery 54 may be depleted to such a low level prior to charging that it does not receive a sufficient amount of charge during block 110 for maintaining its functionality. Therefore, the control module 76 may be programmed to automatically wake-up during a next available low cost charging window in order to access the health of the low voltage battery 54. This "buffer wake-up" is shown schematically at block 112. The determination of when the next available low cost charging window occurs may include retrieving and analyzing electrical rate information 90 over the cloud 66, for example.

Subsequent to the buffer wake-up, at block 114, the control module 76 may immediately determine whether or not the HV battery pack 24 requires any additional charging. If NO, the method 100 proceeds to block 116 at which time the vehicle charging system 56 may enter a sleep mode. The vehicle charging system 56 is awakened at block 118. In an embodiment, the vehicle charging system 56 is commanded to wake-up approximately 24 hours after entering the sleep mode. Waking-up the system 24 hours subsequent to entering the sleep mode will guarantee that the wake-up occurs during a low cost charging window, thereby providing a more cost-effective charge management of the low voltage battery 54.

After waking-up, the control module 76 may determine whether the charge level of the low voltage battery 54 is below a threshold value at block 120. If YES, the low voltage battery 54 is further charged at block 122 in order to ensure that the low voltage battery 54 has a sufficient charge for performing its various functions.

The vehicle systems and methods of this disclosure improve charging by aligning high voltage battery pack bulk charge programming with the charge management of low voltage batteries. This is achieved by scheduling a buffer wake-up to occur during a next available low cost charging window that occurs subsequent to completing HV battery pack bulk charging. Accordingly, once the system wakes-up after a commanded sleep mode, if the low voltage battery needs further support, the system will already be in the low cost charge window for cost-effectively performing charge management of the low voltage battery.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    performing charge management of a low voltage battery of an electrified vehicle, via a vehicle charging system onboard the electrified vehicle, including waking-up the vehicle charging system during a next available low cost charging window subsequent to charging a high voltage battery pack of the electrified vehicle,
    wherein performing the charge management includes scheduling a buffer wake-up to occur during the next available low cost charging window that occurs subsequent to completing the high voltage battery pack charging.

2. The method as recited in claim 1, wherein performing the charge management includes:
    charging the high voltage battery pack and the low voltage battery together during a programmed charging window that occurs prior to the next available low cost charging window.

3. The method as recited in claim 2, comprising:
    receiving a charging window input from a human machine interface system or a personal electronic device, wherein the charging window input is used to establish the programmed charging window.

4. The method as recited in claim 2, comprising:
    charging the high voltage battery pack and the low voltage battery together during the programmed charging window when a current time falls within the programmed charging window.

5. The method as recited in claim 2, wherein performing the charge management includes:
    entering a sleep mode when the high voltage battery pack does not require charging during the next available low cost charging window.

6. The method as recited in claim 5, wherein performing the charge management includes:
    waking-up the vehicle charging system twenty-four hours subsequent to entering the sleep mode.

7. The method as recited in claim 6, wherein performing the charge management includes:
    charging the low voltage battery after waking-up the vehicle charging system from the sleep mode when a charge level of the low voltage battery is below a predefined threshold.

8. The method as recited in claim 1, comprising:
    determining the next available low cost charging window based at least on electrical rate information that includes associated costs for supplying energy from an electrical grid during each hour of a given day.

9. The method as recited in claim 8, comprising:
    retrieving the electrical rate information from a web-based server.

10. The method as recited in claim 1, wherein performing the charge management includes:
    aligning the charge management to occur based off of a programmed charging window associated with the high voltage battery pack.

11. A vehicle charging system, comprising:
    a high voltage battery pack;
    a low voltage battery; and
    a control system configured to command a system wake-up during a next available low cost charging window subsequent to charging the high voltage battery pack and command charge management of the low voltage battery subsequent to the next available low cost charging window when a charge level of the low voltage battery is below a predefined threshold,
    wherein the control system is configured to align a charge programming of the high voltage battery pack with the charge management of the low voltage battery.

12. The vehicle charging system as recited in claim 11, comprising a human machine interface system configured for programming a charging window for charging the high voltage battery pack.

13. The vehicle charging system as recited in claim 11, comprising a communication system configured to retrieve electrical rate information from a web-based server.

14. The vehicle charging system as recited in claim 11, wherein the control system is configured to enter a sleep mode when the high voltage battery pack does not require charging during the next available low cost charging window.

15. The vehicle charging system as recited in claim 14, wherein the control system is configured to command a second system wake-up subsequent to entering the sleep mode.

16. The vehicle charging system as recited in claim 12, wherein the human machine interface system is configured for allowing a user to specify a price threshold above which charging should not be enabled.

17. The vehicle charging system as recited in claim 12, wherein the human machine interface system is configured for allowing a user to specify different charging windows for different days.

18. The method as recited in claim 3, wherein the human machine interface system is configured for allowing a user to specify a price threshold above which charging should not be enabled.

* * * * *